(12) United States Patent
Fujita et al.

(10) Patent No.: US 8,567,770 B2
(45) Date of Patent: Oct. 29, 2013

(54) SEAT SUSPENSION (75) Inventors: Etsunori Fujita, Hiroshima (JP);
Yutaka Sakamoto, Hiroshima (JP);
Hiroki Oshimo, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 107 days.

(21) Appl. No.: 13/146,739

(22) PCT Filed: Feb. 3, 2010

(86) PCT No.: PCT/JP2010/051506
§ 371 (c)(1),
(2), (4) Date: Sep. 27, 2011

(87) PCT Pub. No.: WO2010/090217
PCT Pub. Date: Aug. 12, 2010

(65) Prior Publication Data
US 2012/0007294 A1 Jan. 12, 2012

(30) Foreign Application Priority Data

Feb. 3, 2009 (JP) ................................. 2009-023154

(51) Int. Cl.
*A47C 7/14* (2006.01)
*F16M 13/00* (2006.01)
(52) U.S. Cl.
USPC ........... 267/131; 267/136; 267/256; 267/259; 267/64.11; 267/64.15; 248/566; 248/575
(58) Field of Classification Search
USPC ........... 267/131, 136, 259, 256, 64.11, 64.15; 248/566, 575, 581, 586, 588, 619; 297/344.15, 344.13
See application file for complete search history.

(56) References Cited

U.S. PATENT DOCUMENTS

| 4,729,539 A * | 3/1988 | Nagata ........................... 248/575 |
| 6,585,240 B1 * | 7/2003 | Fujita et al. .................... 267/136 |
| 7,000,910 B2 * | 2/2006 | Oshimo ........................ 267/259 |

(Continued)

FOREIGN PATENT DOCUMENTS

| JP | 2003 320884 | 11/2003 |
| JP | 2005 199939 | 7/2005 |

(Continued)

OTHER PUBLICATIONS

International Search Report issued May 18, 2010 in PCT/JP10/051506 filed Feb. 3, 2010.

*Primary Examiner* — Robert A Siconolfi
*Assistant Examiner* — Mahbubur Rashid
(74) *Attorney, Agent, or Firm* — Oblon, Spivak, McClelland, Maier & Neustadt, L.L.P.

(57) ABSTRACT

To expand a body weight adjustment range and achieve thinning. An initial position adjusting member 15 which can adjust initial resilient forces of two torsion bars 31, 41 is provided. Therefore, a body weight adjustment range is expanded as compared with a conventional configuration where a resilient force of only one torsion bar is adjusted. Since a moving magnet unit 52 is provided such that a moving direction of a moving body coincides with an approximately perpendicular direction to a mutual displacement direction of an upper frame 10 relative to a lower frame 20, the thickness (height) of a fixed magnet unit 51 is made thin as compared with a case where the moving magnet unit is provided such that the moving direction of the moving body coincides with approximately the same direction as the mutual displacement direction of the upper frame relative to the lower frame, so that the thickness of the whole seat suspension at a position at which the upper frame 10 has come closest to the lower frame 20 (a lower limit position) can be made thin.

4 Claims, 6 Drawing Sheets

(56) References Cited

U.S. PATENT DOCUMENTS

| | | | |
|---|---|---|---|
| 7,172,251 B2* | 2/2007 | Takata et al. | 297/344.15 |
| 2003/0218282 A1 | 11/2003 | Sakamoto | |
| 2003/0234476 A1* | 12/2003 | Enoki et al. | 267/136 |

FOREIGN PATENT DOCUMENTS

| | | |
|---|---|---|
| JP | 2006 256391 | 9/2006 |
| JP | 2008 128315 | 6/2008 |

* cited by examiner

SEAT SUSPENSION

TECHNICAL FIELD

The present invention relates to a seat suspension for a vehicle such as an automobile.

BACKGROUND ART

Patent Literature 1 discloses the following seat suspension. That is, the seat suspension is configured such that an upper frame provided so as to be vertically movable to a lower frame attached to a vehicle body floor is resiliently supported by a magnetic spring and a torsion bar, and by utilizing such a fact that the magnetic spring has a negative spring constant in a predetermined displacement range and combining the magnetic spring with the torsion bar having a positive spring constant, the whole spring constant is made extremely small, preferably, substantially zero, and it absorbs vibrations.

Further, in such a seat suspension, it is preferred that two magnet sections configuring the magnetic spring and performing an approaching and separating action mutually are held at a neutral position in a state supporting a load (human body) in order to utilize a region where the spring constant of the magnetic spring becomes negative effectively, namely, in order to secure a large vibration absorbing region where the whole spring constant becomes substantially approximately zero as much as possible. Therefore, in Patent Literature 1, a configuration is provided for detecting a vertical displacement of the upper frame when a load mass has been applied to the upper frame, twisting the torsion bar by a predetermined amount, adjusting a pretension of the torsion bar, moving the upper frame vertically, and setting a mutual position between two magnet sections at a neutral position.

CITATION LIST

Patent Literature

Patent Literature 1: JP-A-2003-320884

SUMMARY OF INVENTION

Technical Problem

However, in the seat suspension described in Patent Literature 1, since such a structure is adopted that the pretension of only one torsion bar is adjusted, there is a case where it is difficult to set the mutual position between the two magnet sections of the magnetic sprint at the neutral position depending on the weight of a seat occupant. Further, in the seat suspension described in Patent Literature 1, a moving magnet unit is provided so as to operate in the same vertical direction as the operating direction of the upper frame relative to a fixed magnet unit configuring the magnetic spring. Therefore, it is necessary to secure a region where the moving magnet unit can operate vertically, which results in such a problem that the thickness of the seat suspension must be thick correspondingly.

The present invention has been made in view of the above, and a problem to be solved thereby is to provide a seat suspension which can expand a body weight adjustment range and can achieve thinning.

Solution To Problem

In order to solve the above problem, a seat suspension according to the present invention is a seat suspension which is provided with a lower frame mounted on a vehicle body floor, an upper frame mounted on the lower frame via a link so as to be movable vertically and supporting a seat, and a spring mechanism supporting the upper frame resiliently, wherein the spring mechanism comprises a combination of a magnetic spring having a negative spring constant in a predetermined displacement range and a resilient member having a positive spring constant; the magnetic spring is provided with a fixed magnet unit which is supported by one of the side of the upper frame and the side of the lower frame and a moving magnet unit which is supported by the other thereof; the fixed magnet unit is provided with a fixed side magnet supporting frame and a fixed side magnet provided on the fixed side magnet supporting frame so as to have magnetic poles facing each other; the moving magnet unit is provided with a moving body composed of a magnet which is movable between the magnetic poles facing each other in the fixed side magnet in a direction perpendicular to a facing direction of the magnetic poles; and the upper frame and the lower frame are coupled to each other by a first link arranged on a front side and a second link arranged on a rear side, torsion bars each serving as the resilient member having a positive spring constant are provided at two coupling portions between the first link and the upper frame and between the second link and the upper frame, or two coupling portions between the first link and the lower frame and between the second link and the lower frame, and an initial position adjusting member which can adjust initial resilient forces of the two torsion bars together is provided.

It is preferred that the initial position adjusting member is provided with two adjustment-operating members connected to the respective torsion bars and a shaft coupling the two adjustment-operating members, and according to movement of a movable plate of one of the adjustment-operating members, a movable plate of the other of the adjustment-operating members can also be moved.

It is preferred that the fixed magnet unit and the moving magnet unit are supported by either one of the upper frame and the lower frame, respectively, such that a moving direction of the moving body coincides with an approximately perpendicular direction to a mutual displacement direction of the upper frame relative to the lower frame.

It is preferred that the fixed side magnet supporting frame of the fixed magnet unit is fixed to the lower frame.

It is preferred that the fixed side magnets of the fixed magnet unit are fixed and supported to the fixed side magnet supporting frame in such an attitude that the fixed side magnets face each other in an approximately vertical direction so as to be spaced by a predetermined spacing, and the moving body of the moving magnet unit is supported to the side of the upper frame via a link and the moving body is provided to be movable in an approximately front-back direction in a clearance between the pair of fixed side magnets.

Advantageous Effect of the Invention

According to the present invention, since such a configuration is adopted that the initial resilient forces of two torsion bars can be adjusted together, a body weight adjustment range is expanded as compared with a conventional configuration where an resilient force of only one torsion bar is adjusted. Further, when such a configuration is adopted that the moving magnet unit is provided such that the moving direction of the moving body coincides with the approximately perpendicular direction to the mutual displacement direction of the upper frame relative to the lower frame, the thickness (height) of the fixed magnet unit becomes thinner as compared with as the case that the moving direction coincides with approximately the same direction as the mutual displacement direction of the upper frame relative to the lower frame, so that the thickness of the whole seat suspension at a position (a lower limit position) where the upper frame has come closest to the lower frame can be made thin.

DESCRIPTION OF EMBODIMENTS

Figure 1:
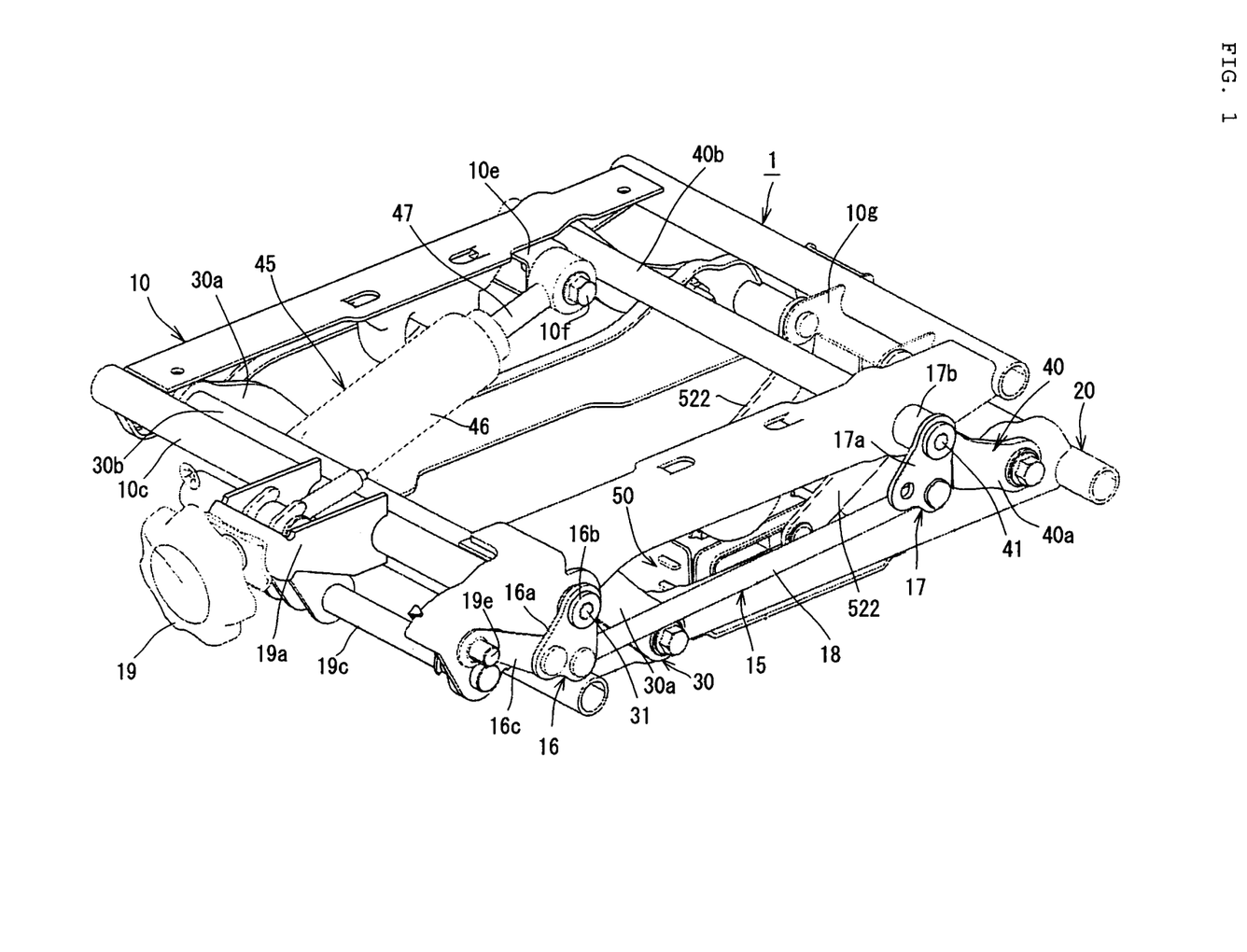
FIG. 1 is a perspective view showing a schematic configuration of a seat suspension according to an embodiment of the present invention as viewed from one side thereof.
Figure 2:
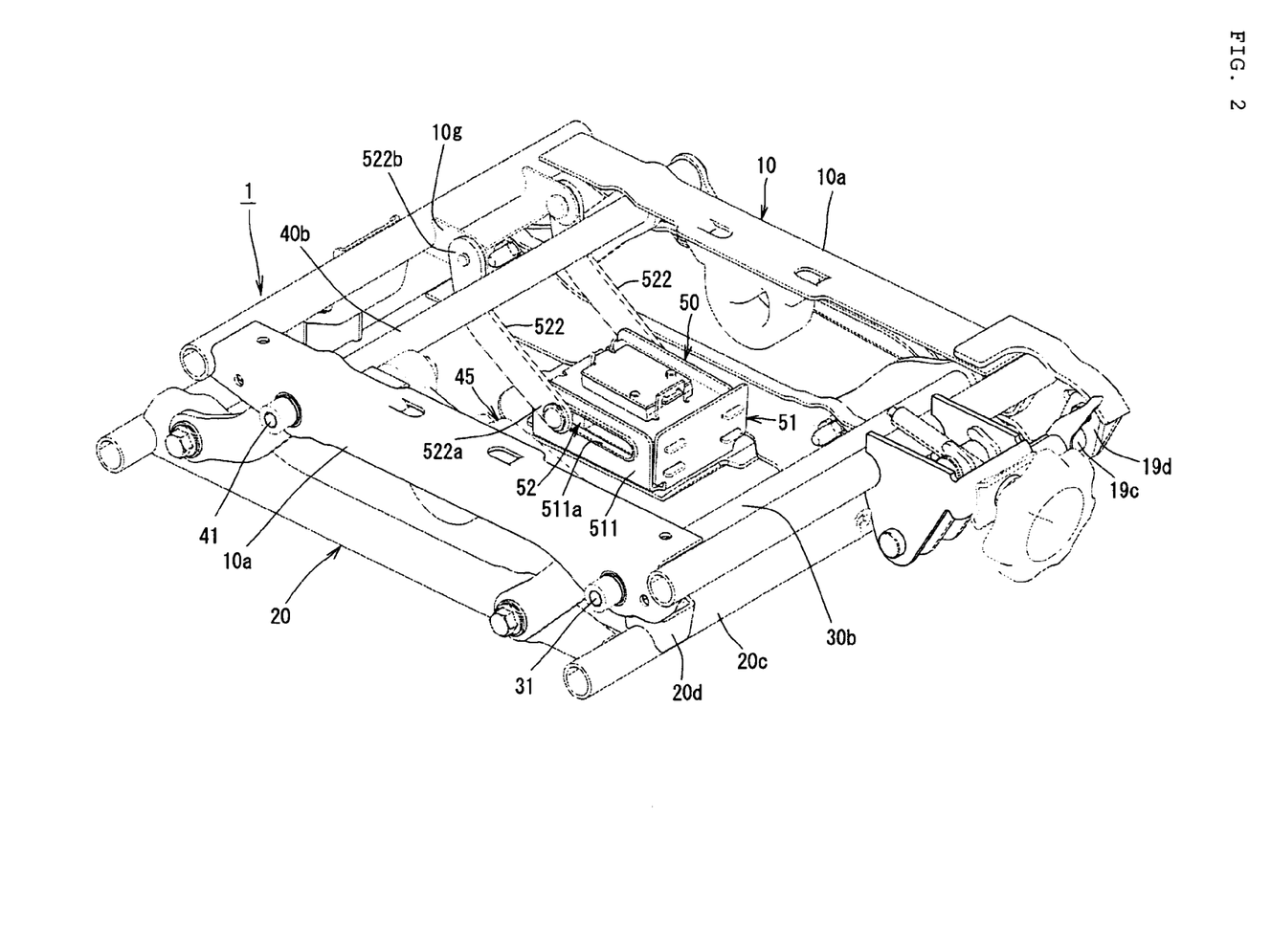
FIG. 2 is a perspective view of the seat suspension shown in FIG. 1 as viewed from another side thereof.
Figure 3:
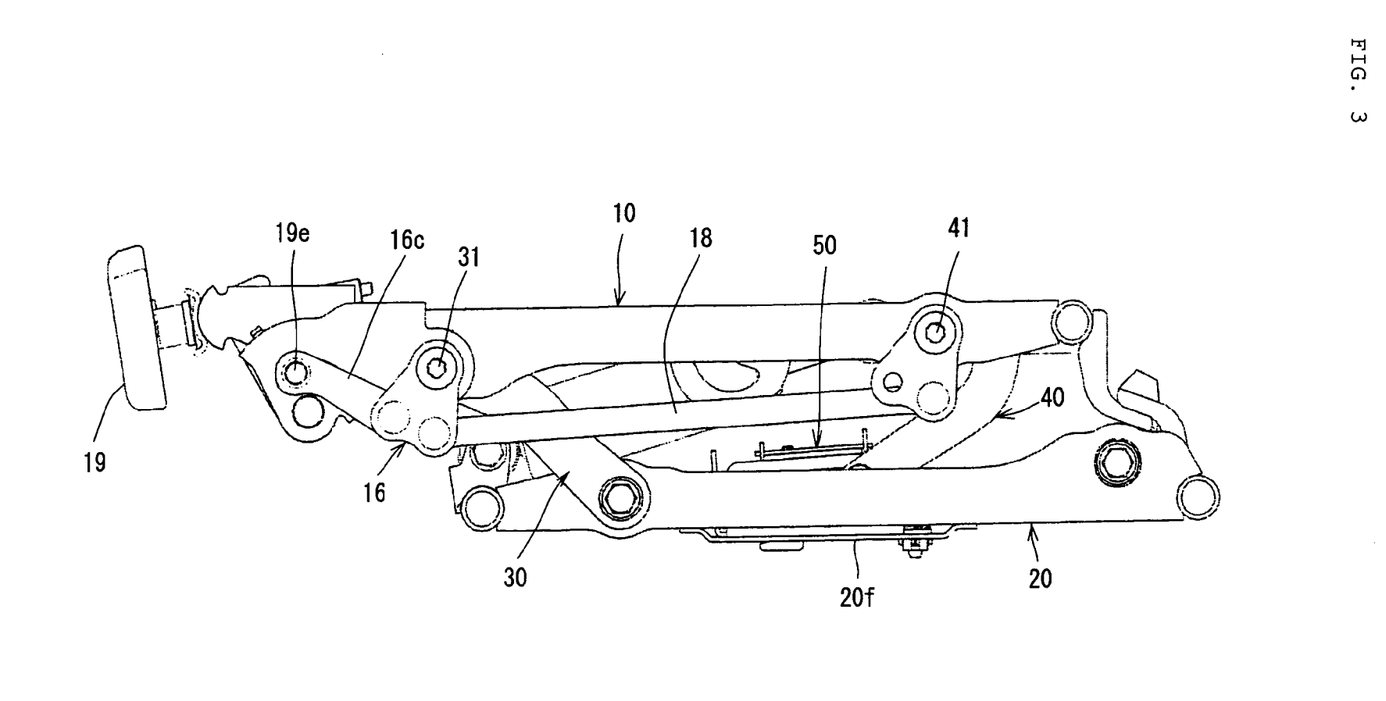
FIG. 3 is a side view of the seat suspension shown in FIG. 1.
Figure 4:
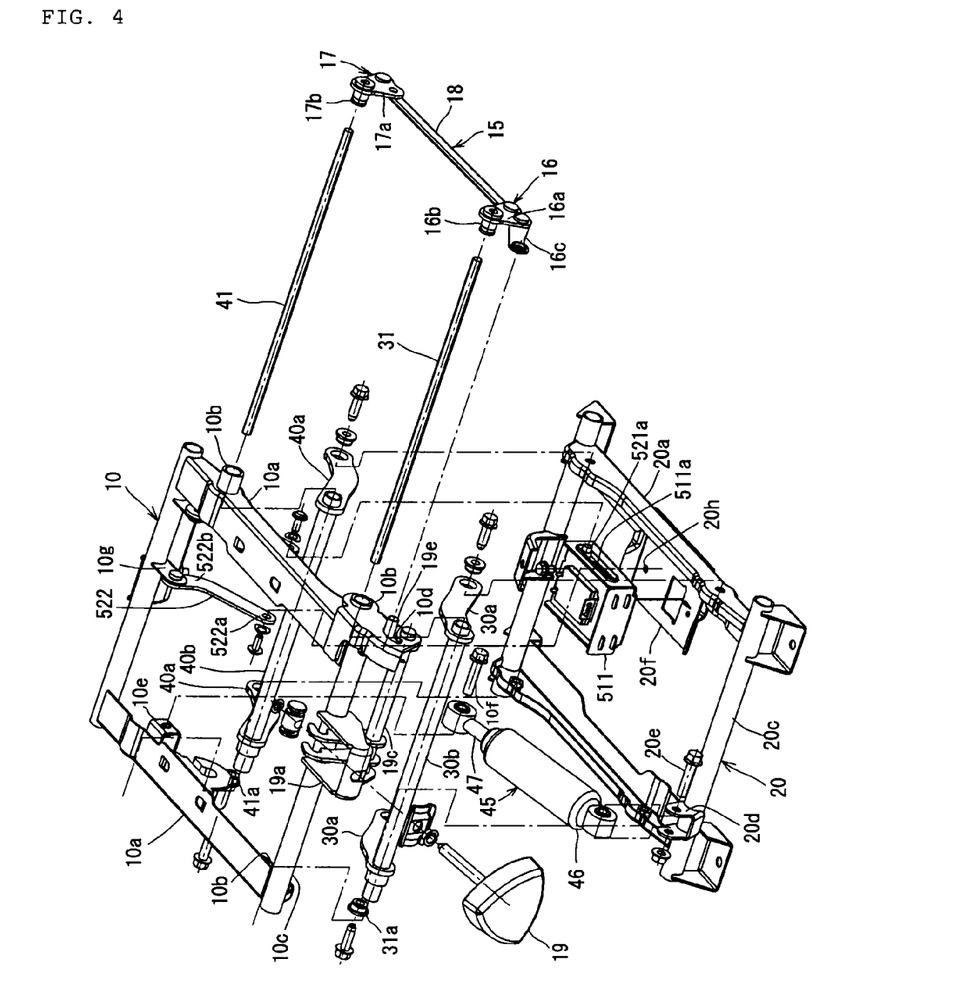
FIG. 4 is an exploded perspective view of the seat suspension shown in FIG. 1.

The present invention will be described below in detail based upon an embodiment shown in figures. FIG. 1 is a perspective view showing a structure of a seat suspension 1 according to an embodiment of the present invention as viewed from one side thereof, FIG. 2 is a perspective view of the structure of the seat suspension 1 as viewed from another side thereof, FIG. 3 is a side view of the structure of the seat suspension 1, and FIG. 4 is an exploded perspective view of the structure of the seat suspension 1.

As shown in these figures, the seat suspension 1 of this embodiment is provided with an approximately rectangular upper frame 10 and an approximately rectangular lower frame 20, the upper frame 10 and the lower frame 20 being coupled to each other via a parallel link mechanism provided with a front link 30 and a rear link 40. A vehicle seat (not shown) is supported by the upper frame 10 and the lower frame 20 is fixed to a vehicle body floor (not shown). A pair of front link 30 and rear link 40 each has a pair of left and right link plates 30a, 30a, 40a, 40a. Upper ends of the pair of link plates 30a, 30a of the front link 30 are coupled to each other via a coupling pipe 30b, while the pair of link plates 40a, 40a are coupled to each other via a coupling pipe 40b. Respective end portions of the coupling pipes 30b, 40b are inserted into mounting holes 10b, 10b formed in a pair of side frames 10a, 10a of the upper frame 10, so that the respective link plates 30a, 30a, 40a, 40a are provided so as to be positioned near side portions of the upper frame 10 and the lower frame 20. Thereby, the upper frame 10 is vertically movable relative to the lower frame 20, namely, moves vertically between an obliquely upward and rear position which is an upper limit position and a obliquely downward and front position which is a lower limit position.

Torsion bars 31, 41 are inserted into the coupling pipes 30b, 40b, respectively. One ends of the torsion bars 31, 41 are provided by detent members 31a, 41a so as not to be rotated relative to the coupling pipes 30b, 40b. Thereby, the torsion bars 31, 41 are set so as to exert resilient forces biasing the upper frame 10 in a direction of separating relative to the lower frame 20, namely, upwardly. The other ends of the torsion bars 31, 41 are coupled to an initial position adjusting member 15 via mounting holes 10b of the side frame 10a.

The initial position adjusting member 15 is composed of two adjustment-operating members 16, 17 and a shaft 18 coupling the two adjustment-operating members 16, 17 to each other. The respective adjustment-operating members 16, 17 are provided with approximately triangular movable plates 16a, 17a and connecting portions 16b, 17b provided near top portions thereof, and the connection portions 16b, 17b are connected to respective other end portions of the torsion bars 31, 41. Further, a front frame 10c of the upper frame 10 is provided with a bracket 19a for supporting an adjustment dial 19. An adjustment shaft 19c arranged with such an attitude that it becomes parallel to the front frame 10c is further supported by the bracket 19a. One end portion of the adjustment shaft 19c is fixed with a plate member 19d, and a projecting pin 19e projecting outwardly is provided on the plate member 19d at a position deviated from an axial center of the adjustment shaft 19c upwardly. The projecting pin 19e is inserted into an arc-shaped hole portion 10d provided so as to be opened near a front portion of the side frame 10a, so that the adjustment shaft 19c is rotated by rotating the adjustment dial 19 and the projecting pin 19e is moved along the arc-shaped hole portion 10d according to the rotation of the adjustment shaft 19c. A link plate 16c projected forward from the movable plate 16a of the adjustment-operating member 16 connected to the torsion bar 31 arranged in the connection pipe 30b of the front link 30 is coupled to the projecting pin 19e.

Accordingly, when the adjustment dial 19 is rotated in either direction, the adjustment shaft 19c is rotated in either one direction and the projecting pin 19e is moved within the arc-shaped hole portion 10d in either one direction. Then, since the link plate 16c is displaced in either one direction of front and rear directions according to the movement, the movable plate 16a on the side of the front link 30 is displaced in either one direction of the front and rear directions according to the displacement, and the movable plate 17a on the side of the rear link 40 is also displaced in either one direction of the front and rear directions via the shaft 18. Thereby, since the connecting portions 16b, 17b are rotated in either direction, the torsion bars 31, 41 are twisted in either direction, and inclination angles of the link plates 30a, 30a of the front link 30 and the link plates 40a, 40a of the rear link 40 are changed by resilient forces of the torsion bars, so that an initial position of the upper frame 10 (initial resilient forces of the torsion bars 31, 41) is adjusted.

An oil damper 45 is attached between a bracket 20d attached to a front frame 20c of the lower frame 20 and a coupling member 10e attached to the side frame 10a in the upper frame 10. A rear end portion of a cylinder 46 of the oil damper 45 is rotatably supported to the bracket 20d via a pin 20e, and a distal end portion of a piston 47 of the oil damper 45 is rotatably supported to the coupling member 10e via a pin 10f. According to a relative displacement of the piston 47 to the cylinder 46, especially, when impact vibrations are inputted into the oil damper 45, the oil damper 45 functions to dampen energy thereof.

In the seat suspension of this embodiment, a spring mechanism which resiliently supports the upper frame 10 is configured by combination of the above-described torsion bars 31, 41 having positive spring constants and a magnetic spring having a negative spring constant in a predetermined displacement range.

Figure 6:
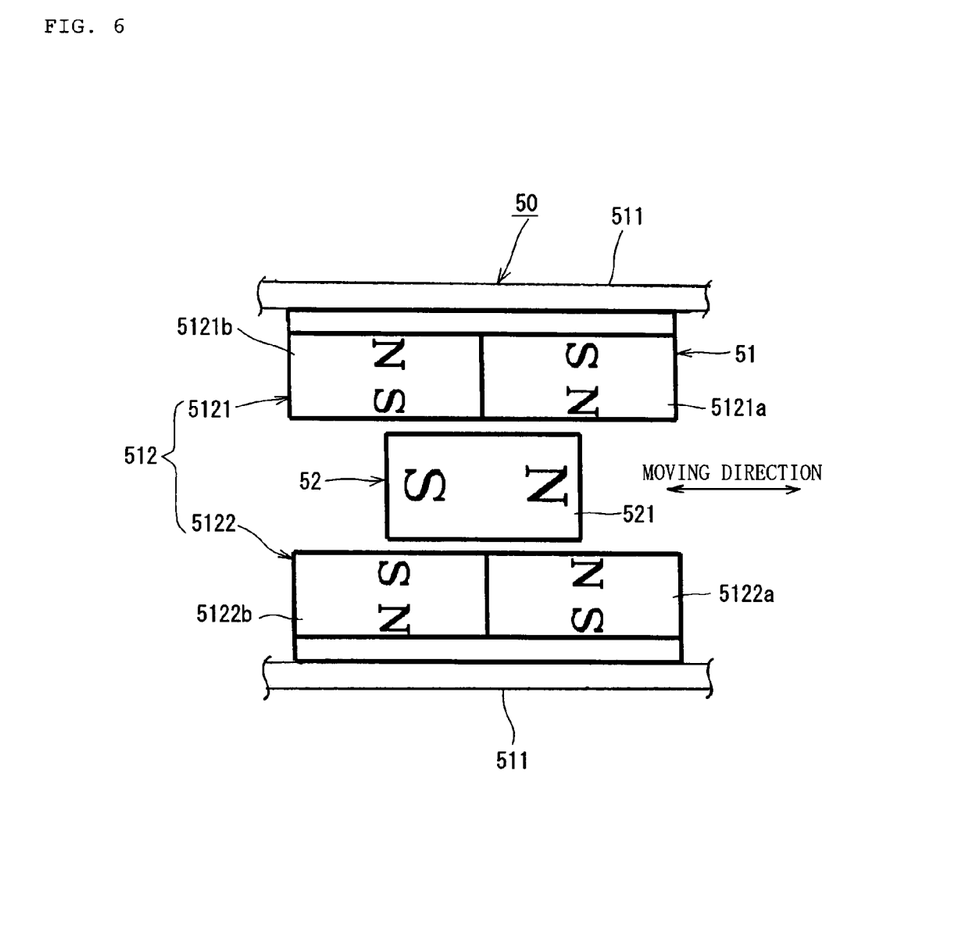
FIG. 6 is a diagram showing an arrangement relationship between fixed side magnets configuring a fixed magnet unit of a magnetic spring and a moving body configuring a moving magnet unit and one example of a magnet configuration.

As shown in FIG. 2, the magnetic spring 50 is provided with a fixed magnet unit 51 and a moving magnetic unit 52. The fixed magnet unit 51 is provided with a fixed side magnet supporting frame 511 and a fixed side magnet 512. The fixed side magnet 512 is provided with a pair of permanent magnet groups 5121, 5122 disposed so as to face each other to be separated by a predetermined distance, for example, as shown in FIG. 6. In this example, the permanent magnet groups 5121, 5122 are each composed of two permanent magnets 5121a, 5121b, 5122a, 5122b magnetized in their thickness directions and disposed such that different poles are positioned adjacent to each other in an axial direction (in a moving direction of a moving body 521 of the moving magnet unit 52).

Figure 5:
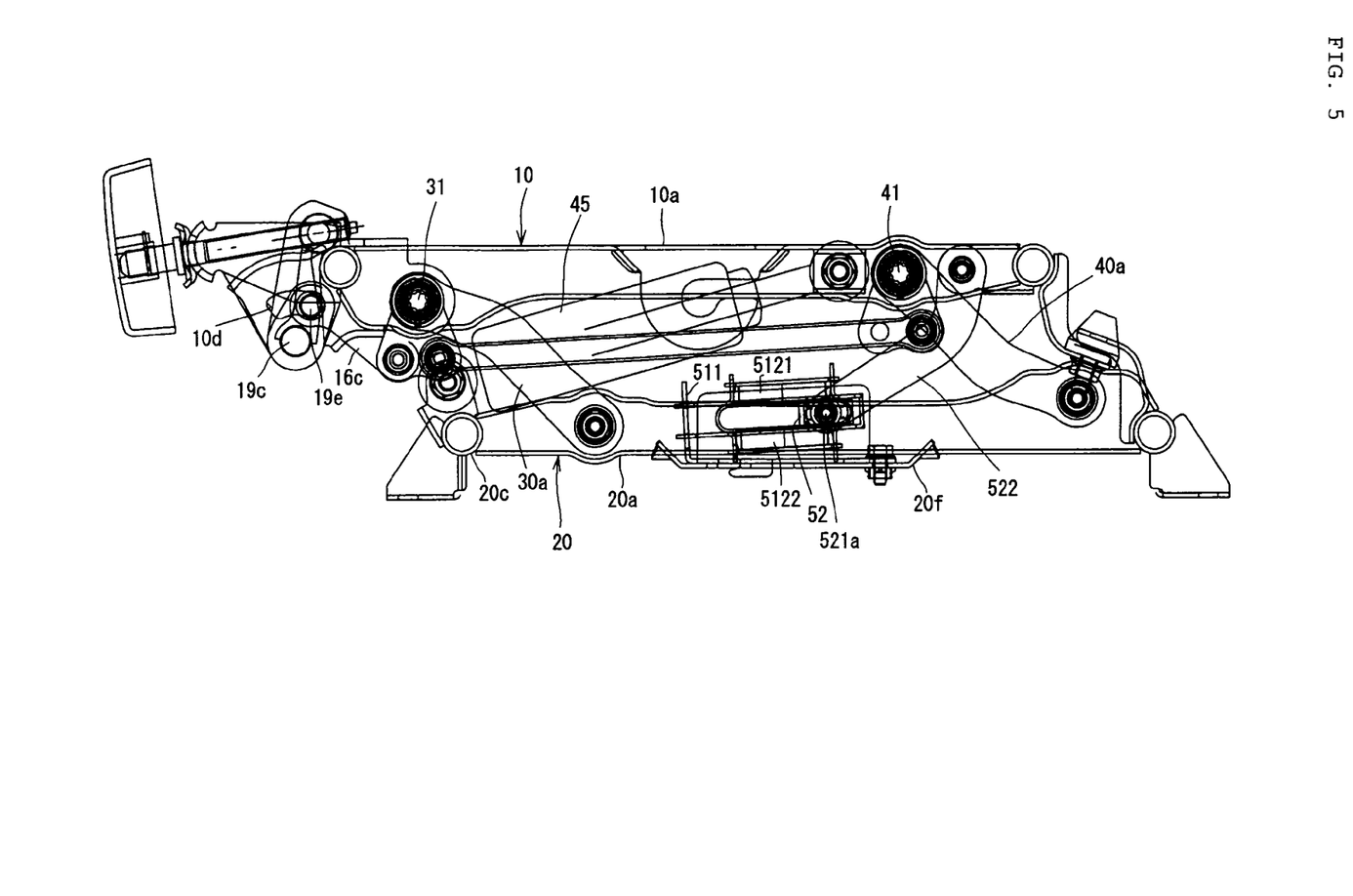
FIG. 5 is a sectional view of the seat suspension shown in FIG. 1.

As shown in FIG. 2, the fixed side magnet supporting frame 511 is formed in a box shape configuring a parallelepiped externally, and the fixed magnet groups 5121, 5122 configuring the fixed side magnet 512 are disposed within the fixed side magnet supporting frame 511 so as to face each other to be separated from each other by the predetermined distance, as described above. In the fixed magnet unit 51, the fixed side magnet supporting frame 511 is fixed to a plate-shaped bracket 20f provided on a side frame 20a of the lower frame 20. At this time, the fixed side magnet supporting frame 511 is disposed such that one fixed side magnet group 5121 is positioned on the upper side and the other fixed side magnet group 5122 is positioned on the lower side, namely, with such an attitude that two fixed magnet groups 5121, 5122 face each other approximately in a vertical direction (see FIG. 5). However, as shown in FIG. 5, the fixed side magnet supporting frame 511 is provided obliquely such that a rear end thereof is slightly higher than a front end thereof.

As shown in FIG. 6, the moving magnet unit 52 is provided with the moving body 521 comprising a permanent magnet. The moving body 521 is provided to be positioned between the fixed magnet groups 5121, 5122 configuring the above-described fixed magnet (namely, between magnetic poles of the fixed magnet groups 5121, 5122 facing each other). Here, a long hole 511a is formed in a side plate of the fixed side magnet supporting frame 511 at a position corresponding to a clearance between the fixed magnet groups 5121, 5122, each side portion 521a of the moving body 521 is provided so as to face the outside via the long hole 511a, and one end 522a of a link 522 is pivoted to each side portion 521a. The other end 522b of the link 522 of the moving magnet unit 52 is pivoted to a bracket 10g provided on the rear frame 10d of the upper frame 10, and the moving magnet unit 52 is provided on the side of the upper frame 10.

As the result of the above arrangement, the moving body 521 of the moving magnet unit 52 slides back and forth between the fixed magnet groups 5121, 5122 according to a relative displacement of the upper frame 10 to the lower frame 20. Specifically, when the upper frame 10 is displaced downwardly, the link 522 causes the moving body 521 to operate in the front direction, and when the upper frame 10 is displaced upwardly, the link 522 causes the moving body 521 to operate in the back direction. That is, since the upper frame 10 is displaced vertically relative to the lower frame 20, the moving body 521 is displaced in the front and back directions which are approximately perpendicular to the vertical direction.

At this time, in this embodiment, such a structure is adopted that a relationship between a load of the upper frame 10 and a displacement amount of the moving body 521 which is displaced according to increase/decrease of the load in a predetermined range of a region where the moving body 521 is movable back and forth shows a characteristic of a negative spring constant where the load decreases even if the displacement amount increases. Incidentally, the negative spring constant is produced according to how respective magnets of the above-described fixed magnet groups 5121, 5122 are arranged.

Therefore, the seat suspension 1 of this embodiment provided with the magnetic spring 50 and the above-described torsion bars 31, 41 has a constant load region where the positive spring constants of the above-described torsion bars 31, 41 are overlapped on the negative spring constant in a range where the negative spring constant in the magnetic spring 50 functions so that even if the displacement amount increases, the load does not change, namely, a region where the spring constant becomes substantially zero.

In order to utilize the region where the spring constant becomes substantially zero effectively as much as possible, it is preferred that the moving body 521 of the moving magnet unit 52 is positioned at an approximate center (hereinafter, called "neutral position") in the region where the spring constant becomes substantially zero in a state that a person has sat on the seat supported by the upper frame 10. However, since weights of persons are different individually, if the initial resilient forces of the torsion bars 31, 41 are constant, the moving body 521 is not always positioned at the neutral position. Therefore, when a person sits on the seat, the magnetic spring 50 is set at the neutral position by turning the adjustment dial 19 of the initial position adjusting member 15 to adjust the initial resilient forces of the torsion bars 31, 41. At this time, in this embodiment, since two torsion bars 31, 41 are provided and the two torsion bars 31, 41 are coupled to each other by the adjustment-operating members 16, 17, and the shaft 18 so that the initial resilient forces of both the torsion bars can be adjusted at one time, a body weight adjustment range is expanded as compared with the conventional configuration where the resilient force of only one torsion bar is adjusted. Further, bottom contact generated by large impact vibrations can be reduced.

Further, as described above, the fixed magnet unit 51 is provided such that the fixed magnet groups 5121, 5122 are disposed so as to face each other in a vertical direction and the moving body 521 of the moving magnet unit 52 operates through the clearance between the fixed magnet groups 5121, 5122 back and forth via the link 522. On the other hand, a member (a movable magnet) corresponding to the moving body 521 of the moving magnet unit 52 and shown in the above-described JPA-2003-320884 (Patent Literature 1) is provided so as to operate in a vertical direction. Accordingly, the height (thickness), in the vertical direction, of the fixed side magnet frame 511 configuring the fixed magnet unit 51 of this embodiment is thinner and flatter than the member disclosed in Patent Literature 1. Therefore, the lower limit position where the upper frame 10 comes closest to the lower frame 20 can be set lower than that disclosed in Patent Literature 1. That is, the thickness of the whole seat suspension when the upper frame 10 is positioned at the lower limit position can be made thin, which contributes to thinning and size-reducing of the whole seat including the seat suspension as well as a seat cushion and the like.

Incidentally, in the above explanation, two adjustment-operating members 16, 17 of the initial position adjusting member 15 are adjusted by operating the adjustment dial 19 manually, but such a configuration can be adopted that the adjustment shaft 19c is rotated by electric power. Further, such a configuration can be adopted that a body weight detecting apparatus (not shown) is provided and adjustment is performed by automatically rotating the adjustment shaft 19c in conformity with the body weight detected.

REFERENCE SIGNS LIST

1: seat suspension
10: upper frame

15: initial position adjusting member
20: lower frame
30: front link
31: torsion bar
40: rear link
41: torsion bar
45: oil damper
50: magnetic spring
51: fixed magnet unit
511: fixed side magnet supporting frame
512: fixed side magnet
5121, 5122: fixed side magnet group
52: moving magnet unit
521: moving body
522: link

The invention claimed is:

1. A seat suspension which is provided with a lower frame mounted on a vehicle body floor, an upper frame mounted on the lower frame via a link so as to be movable vertically and supporting a seat, and a spring mechanism supporting the upper frame resiliently, wherein
the spring mechanism comprises a combination of a magnetic spring having a negative spring constant in a predetermined displacement range and a resilient member having a positive spring constant;
the magnetic spring is provided with a fixed magnet unit which is supported by one of the side of the upper frame and the side of the lower frame and a moving magnet unit which is supported by the other thereof;
the fixed magnet unit is provided with a fixed side magnet supporting frame and a fixed side magnet provided on the fixed side magnet supporting frame so as to have magnetic poles facing each other;
the moving magnet unit is provided with a moving body composed of a magnet which is movable between the magnetic poles facing each other in the fixed side magnet in a direction perpendicular to a facing direction of the magnetic poles; and
the upper frame and the lower frame are coupled to each other by a first link arranged on a front side and a second link arranged on a rear side, two torsion bars, each serving as the resilient member having a positive spring constant, are provided at two coupling portions between the first link and the upper frame and between the second link and the upper frame, or two coupling portions between the first link and the lower frame and between the second link and the lower frame, and an initial position adjusting member which can adjust initial resilient forces of the two torsion bars together is provided,
wherein the initial position adjusting member is provided with two adjustment-operating members connected to the respective torsion bars and a shaft coupling the two adjustment-operating members, and according to movement of a movable plate of one of the adjustment-operating members, a movable plate of the other of the adjustment-operating members can also be moved.

2. The seat suspension according to claim 1, wherein the fixed magnet unit and the moving magnet unit are supported by either one of the side of the upper frame and the side of the lower frame, respectively, such that a moving direction of the moving body coincides with an approximately perpendicular direction to a mutual displacement direction of the upper frame relative to the lower frame.

3. The seat suspension according to claim 2, wherein the fixed side magnet supporting frame of the fixed magnet unit is fixed to the lower frame.

4. The seat suspension according to claim 2, wherein the fixed side magnets of the fixed magnet unit are fixed and supported to the fixed side magnet supporting frame in such an attitude that the fixed side magnets face each other in an approximately vertical direction so as to be spaced by a predetermined spacing, and the moving body of the moving magnet unit is supported to the side of the upper frame via a link and the moving body is provided to be movable in an approximately front-back direction in a clearance between the pair of fixed side magnets.

* * * * *